United States Patent [19]
Reinke et al.

[11] Patent Number: 5,449,125
[45] Date of Patent: Sep. 12, 1995

[54] FILM SPOOL WITH INTERNAL FLEXURES TO ENGAGE AND RELEASE FILM END

[75] Inventors: Stephen M. Reinke; Thomas P. Melanson, both of Rochester, N.Y.

[73] Assignee: Eastman Kodak Company, Rochester, N.Y.

[21] Appl. No.: 181,322

[22] Filed: Jan. 14, 1994

[51] Int. Cl.[6] .............................................. B65H 75/28
[52] U.S. Cl. ................................. 242/348.1; 242/587.1
[58] Field of Search .................. 242/348, 348.1, 348.3, 242/587.1, 587.2, 587.3; 354/275; 352/78 R

[56] References Cited

U.S. PATENT DOCUMENTS

| | | |
|---|---|---|
| 2,194,560 | 3/1940 | Marchev et al. .............. 242/587.1 |
| 2,487,479 | 11/1949 | Roehrl ........................... 242/348.1 |
| 2,917,251 | 12/1959 | Newburger . | 
| 2,977,060 | 3/1961 | Berning et al. ................. 242/587.2 |
| 3,246,729 | 4/1966 | Bishop ....................... 242/587.1 X |
| 3,715,088 | 2/1973 | Rissberger .................... 242/587.2 |
| 3,743,204 | 7/1973 | Hertel ........................... 242/587.1 |
| 4,334,750 | 6/1982 | Fichter . |
| 4,364,529 | 12/1982 | Barto, Jr. et al. ............. 242/587.1 |
| 4,834,310 | 5/1989 | Ikariya et al. . |
| 4,984,751 | 1/1991 | Hoffacker et al. . |
| 5,054,710 | 10/1991 | Ikariya et al. . |
| 5,188,306 | 2/1993 | Kataoka et al. ................ 354/275 X |

Primary Examiner—John P. Darling
Attorney, Agent, or Firm—Roger A. Fields

[57] ABSTRACT

A film spool comprises a rigid spool core having a slot, first and second resilient flexures located inside the slot for flexing away from each other in response to axial compression at opposite ends of the flexures to permit a film end to be inserted between or removed from the flexures and being biased to return toward each other when the compression is removed, a film engagement protrusion projecting from the first flexure to between the first and second flexures to engage a film end to secure the film end to the spool core when the flexures are returned toward each other, and a film stripper protrusion projecting from the second flexure to between the first and second flexures to disengage a film end from the film engagement protrusion when the flexures are flexed away from each other.

5 Claims, 3 Drawing Sheets

FILM SPOOL WITH INTERNAL FLEXURES TO ENGAGE AND RELEASE FILM END

CROSS-REFERENCE TO RELATED APPLICATIONS

Reference is made to commonly assigned copending applications Ser. No. 08/182,255, entitled FILM SPOOL WIH INTEGRAL CANTILEVER TO ENGAGE AND RELEASE FILM END and filed Jan. 14, 1994 in the name of Stephen M. Reinke, and Ser. No. 08/181,935, entitled FILM SPOOL WITH AXIALLY FLEXIBLE CORE TO ENGAGE AND RELEASE FILM END and filed Jan. 14, 1994 in the name of Stephen M. Reinke, each of which are assigned to the assignee of this application.

FIELD OF THE INVENTION

The invention relates generally to the field of photography, and in particular to film spools. More specifically, the invention relates to a film spool with a rigid core or hub which has internal flexures that can be flexed in opposite directions to engage and release one end of a filmstrip intended to be wound in a film roll onto the spool.

BACKGROUND OF THE INVENTION

The typical film spool, such as a supply spool in a film cartridge or a take-up spool in a camera, is known to include some means for releaseably attaching a film end to the spool.

For example, prior art U.S. Pat. No. 4,334,750, issued Jun. 15, 1982, discloses a film spool comprising an off-axis peripheral slot in the spool core which is dimensioned to receive a reduced-width film end, and a film engagement protrusion that projects through an internal opening into the slot to engage the film end. The engagement protrusion is located on one of two legs of a u-shaped resilient member which is slidable inwardly along a central hollow in the spool core until the engagement protrusion pops through the internal opening from the central hollow into the slot to engage the film end. To release the film end, the engagement protrusion is retracted through the internal opening from the slot into the central hollow as a result of sliding the u-shaped resilient member further along the central hollow against a fixed camming incline in the hollow.

According to another example, prior art U.S. Pat. No. 2,917,251, issued Dec. 15, 1959, discloses a film spool comprising an intermediate resilient hollow section of the spool core which can be bulged outwardly by pressing inwardly at opposite ends of the core. As a result, a pair of axially extending peripheral slits in the spool core will be opened to permit a film end to be inserted into the slits.

PROBLEMS TO BE SOLVED BY THE INVENTION

Prior art U.S. Pat. No. 2,917,251 lacks any means to affirmatively secure a film end in the slits. This allows the film end to be unintentionally pulled out of the slits. Also, there are no constraints in regard to the extent to which the resilient hollow section of the spool core can be bulged outwardly by pressing inwardly at opposite ends of the core. Thus, a fracture might result.

In prior art U.S. Pat. No. 4,334,750, a film end might be unintentionally slipped off the film engagement protrusion. Also, the film engagement protrusion must be retracted from the slot to release the film end, and the u-shaped resilient member can be slid far enough into the central hollow of the spool core when the film engagement protrusion is retracted from the slot that the resilient member may become impossible to grasp in order to reuse the film engagement protrusion.

SUMMARY OF THE INVENTION

According to one aspect of the invention, there is provided a film spool comprising:
 a rigid spool core having a slot;
 first and second resilient flexures located inside the slot for flexing away from each other in response to axial compression at opposite ends of the flexures to permit a film end to be inserted between or removed from the flexures and being biased to return toward each other when the compression is removed;
 a film engagement protrusion projecting from the first flexure to between the first and second flexures to engage a film end to secure the film end to the spool core when the flexures are returned toward each other; and
 a film stripper protrusion projecting from the second flexure to between the first and second flexures to disengage a film end from the film engagement protrusion when the flexures are flexed away from each other.

ADVANTAGEOUS EFFECTS OF THE INVENTION

The invention eliminates the problems that may occur with the film spools disclosed in prior art U.S. Pat. Nos. 4,334,750 and 2,917,251.

DETAILED DESCRIPTION OF THE INVENTION

The invention is disclosed as being embodied preferably in a film spool. Because the features of a film spool are generally known, the description which follows is directed in particular only to those elements forming part of or cooperating directly with the disclosed embodiment. It is to be understood, however, that other elements may take various forms known to a person of ordinary skill in the art.

Figure 1:
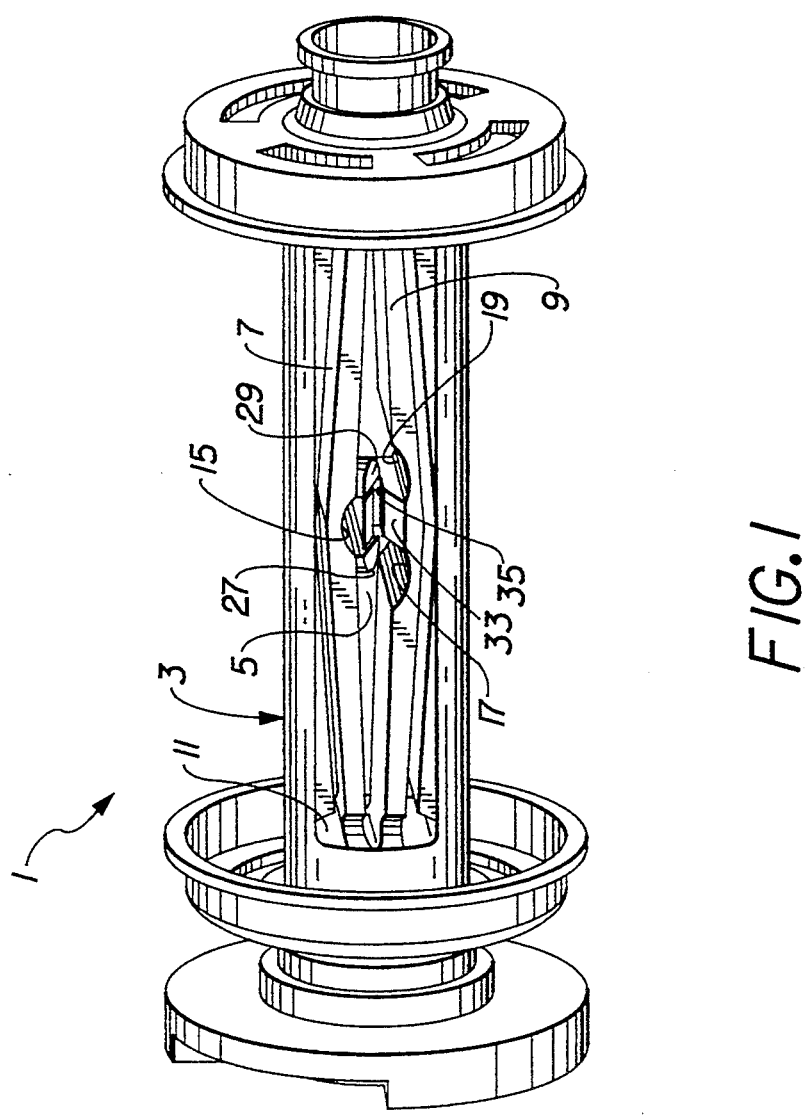
FIG. 1 is a perspective view of a film spool according to a preferred embodiment of the invention.
Figure 2:
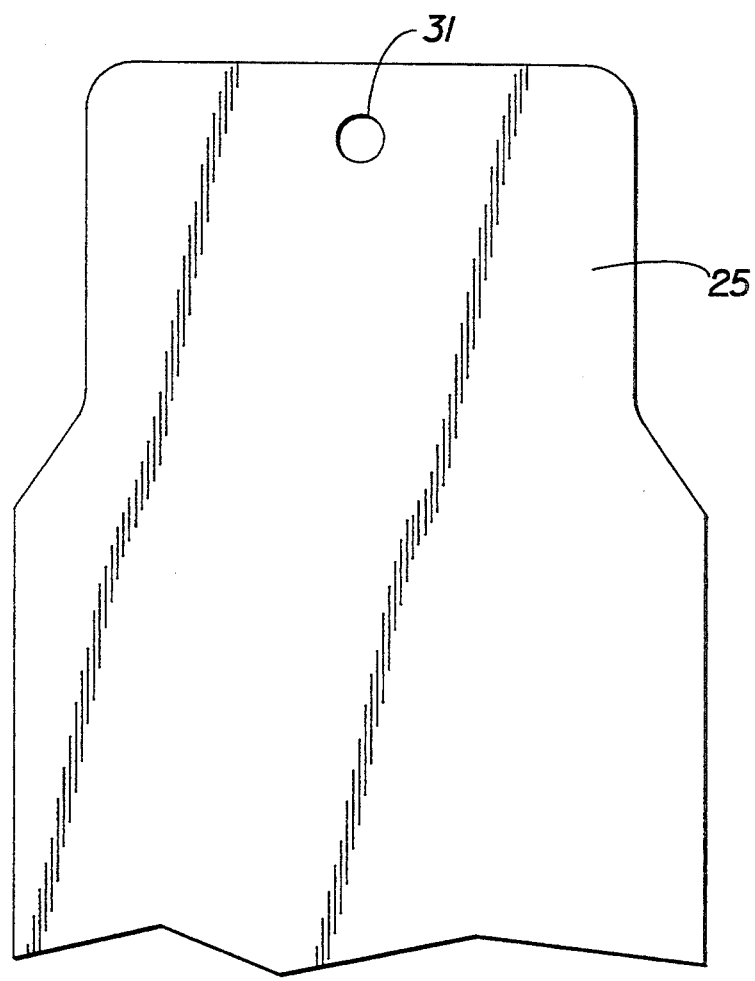
FIG. 2 is a plan view of a film end to be used with the film spool.
Figure 3:
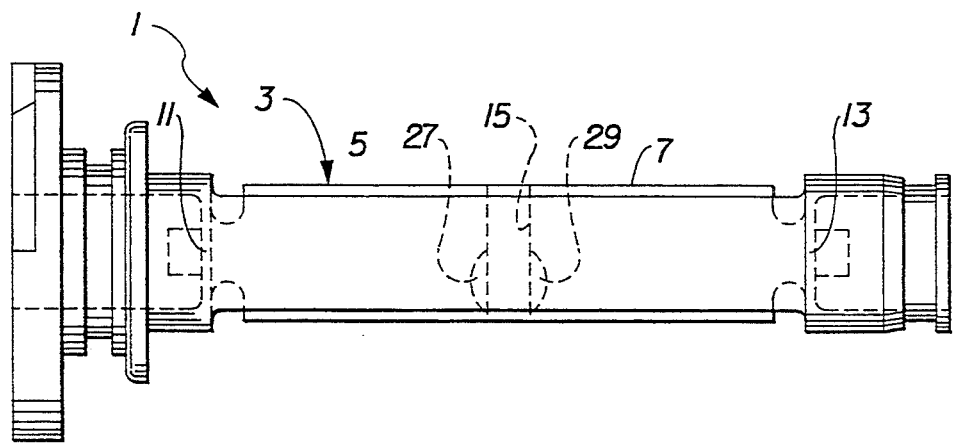
FIG. 3 is a plan view of the film spool.
Figure 4:
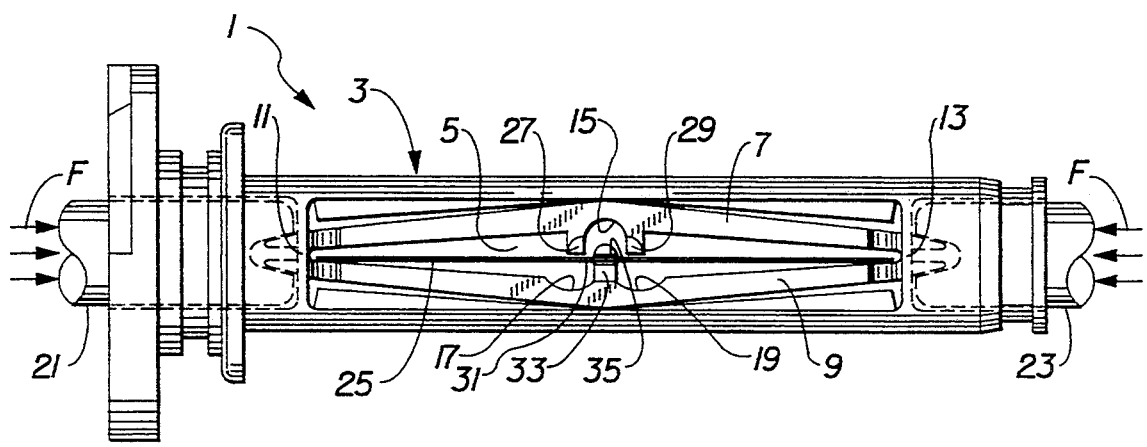
FIGS. 4 and 5 are plan views of the film spool, though shown at a different rotation angle than in FIG. 3, depicting how the film end is secured to the spool.
Figure 5:
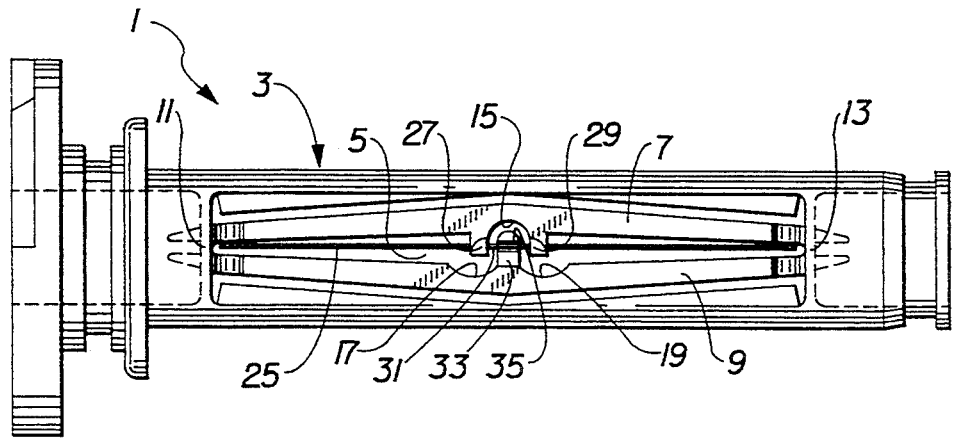

Referring now to the drawings, FIGS. 1 and 3-5 show a film spool 1 with a rigid spool core 3 having a slot 5. A pair of resilient spaced flexures 7 and 9 or bending members are located facing each other inside the slot 5. The flexures 7 and 9 are joined at opposite resilient disk-like ends 11 and 13, which like the flexures are integrally formed with the spool core 3. A single central cut-out 15 is provided in the flexure 7 and a pair of identical, spaced, central cut-outs 17 and 19 are provided in the flexure 9 to effect respective weakened or pivot areas in the flexures. Consequently, as can be seen in FIGS. 4 and 5, the flexures 7 and 9 can be flexed away from each other in response to compressive or inwardly pushing forces F being applied to the disk-like ends 11 and 13 by actuation tools 21 and 23. This permits a film end 25 to be inserted between or removed from the flexures 7 and 9. When the actuation tools 21 and 23 are retracted from the disk-like ends 11 and 13 to remove the compressive forces F, the flexures due to their own bias return toward each other. See FIG. 5.

A pair of spaced matching film engagement protrusions 27 and 29 project from the flexure 7, at opposite sides of the cut-out 15, to between the flexures 7 and 9. The protrusions 27 and 29 are intended to be received in a hole 31 in the film end 25 to engage the film end between the flexures 7 and 9 to secure the film end to the spool core 3, when the flexures are returned toward each other as shown in FIG. 5.

A film stripper/anti-slippage protrusion 33 projects from the flexure 9, between the cut-outs 17 and 19, towards the cut-out 15. The protrusion 33 includes a film supporting notch 35. As can be seen in FIGS. 4 and 5, to secure the film end 25 to the spool core 3, compressive or inwardly pushing forces F are applied by the actuation tools 21 and 23 to the disk-like ends 11 and 13 to flex the flexures 7 and 9 away from each other. With the flexures 7 and 9 held flexed apart, the film end 25 is inserted between the flexures and into the notch 35. As shown in FIG. 4, at this time the notch 35 and the protrusions 27 and 29 are located beyond each other. Then, the actuation tools 21 and 23 are retracted from the disk-like ends 11 and 13 to remove the compressive forces F, and the flexures 7 and 9 due to their own bias return toward each other. See FIG. 5. Movement of the flexures toward each other brings the notch 35 and the protrusions 27 and 29 subtantially into alignment to cause the protrusions to be received in the hole 31 in the film end 25.

As shown in FIG. 5, the notch 35 operates to hold the film end 25 in engagement with the protrusions 27 and 29 to prevent the film end from slipping off the protrusions as long as the notches and the protrusions are located substantially in alignment. However, when the flexures 7 and 9 are flexed away from each other to locate the notch 35 and the protrusions 27 and 29 beyond each other, the notch operates to remove the film end 25 from the protrusions. See FIG. 4.

The invention has been described with reference to a preferred embodiment. However, it will be appreciated that variations and modifications can be effected by a person of ordinary skill in the art without departing from the scope of the invention.

PARTS LIST FOR FIGS. 1-5

1. film spool
3. spool core
5. slot
7 & 9. flexures
11 & 13. disk-like ends
15, 17 & 19. cut-outs
21 & 23. actuation tools
25. film end
27 & 29. film engagement protrusions
31. film hole
33. film stripper/anti-slippage protrusion
35. film supporting notch
F. force

What is claimed is:

1. A film spool comprising:
    a rigid spool core having a slot;
    first and second resilient flexures located inside said slot for flexing away from each other in response to axial compression at opposite ends of said flexures to permit a film end to be inserted between or removed from the flexures and being biased to return toward each other when the compression is removed;
    a film engagement protrusion projecting from said first flexure to between said first and second flexures to engage a film end to secure the film end to said spool core when the flexures are returned toward each other; and
    a film stripper protrusion projecting from said second flexure to between said first and second flexures to disengage a film end from said film engagement protrusion when the flexures are flexed away from each other.

2. A film spool as recited in claim 1, wherein said film stripper protrusion includes film supporting means for supporting a film end and being movable with the film stripper protrusion to position the film end in engagement with said film engagement protrusion when said first and second flexures are returned toward each other.

3. A film spool comprising:
    a rigid spool core having a slot;
    first and second resilient flexures located inside said slot for flexing away from each other in response to axial compression at opposite ends of said flexures to permit a film end to be inserted between or removed from the flexures and being biased to return toward each other when the compression is removed;
    a film engagement protrusion projecting from said first flexure to between said first and second flexures to engage a film end to secure the film end to said spool core when the flexures are returned toward each other; and
    an anti-slippage protrusion projecting from said second flexure to between said first and second flexures to hold a film end in engagement with said film engagement protrusion to prevent the film end from slipping off the film engagement protrusion and being movable with the second flexure to allow the film end to be disengaged from the film engagement protrusion when the flexures are flexed away from each other.

4. A film spool as recited in claim 3, wherein said anti-slippage protrusion includes film supporting means for supporting a film end and being movable with the anti-slippage protrusion to position the film end in engagement with said film engagement protrusion when said first and second flexures are returned toward each other.

5. A film spool as recited in claim 3, wherein said anti-slippage protrusion includes film stripper means for disengaging a film end from said film engagement protrusion when said first and second flexures are flexed away from each other.

* * * * *